United States Patent
Holbrook

(10) Patent No.: US 6,909,497 B2
(45) Date of Patent: Jun. 21, 2005

(54) OPTICAL CHARACTERISTIC MEASUREMENT AND COMPENSATION APPARATUS AND METHOD

(76) Inventor: David Scott Holbrook, 262 East St., Lexington, MA (US) 02420

( * ) Notice: Subject to any disclaimer, the term of this patent is extended or adjusted under 35 U.S.C. 154(b) by 0 days.

(21) Appl. No.: 10/712,906

(22) Filed: Nov. 12, 2003

(65) Prior Publication Data

US 2004/0095582 A1 May 20, 2004

Related U.S. Application Data

(60) Provisional application No. 60/424,763, filed on Nov. 12, 2002.

(51) Int. Cl.[7] .............................................. G01N 21/00
(52) U.S. Cl. ..................................................... 356/73.1
(58) Field of Search ............................... 356/73.1, 497, 356/477, 364–368, 450, 491

(56) References Cited

U.S. PATENT DOCUMENTS 6,175,416 B1 * 1/2001 Maris et al. ................. 356/630
6,646,727 B2 * 11/2003 Saleh et al. ................. 356/73.1
6,788,410 B1 * 9/2004 Otani et al. .................. 356/364

* cited by examiner

Primary Examiner—Tu T. Nguyen

(57) ABSTRACT

The invention relates to an entangled-photon apparatus capable of measuring particular characteristics of an optical element, device or channel and further capable of correcting for the effects of these characteristics in an optical communications signal propagating through the same optical element. The apparatus includes a source of entangled photons (twinons), which are injected into the device under test along with the communications signal, and a two branch quantum interference device (QID) for determining the state of entanglement of the photons after they pass through the device. The QID includes a variable delay element that is incremented to equalize the twinon correlation in the two branches of the QID. A second variable delay element, slaved to the first, applies the corresponding compensation to the communications signal.

19 Claims, 4 Drawing Sheets

OPTICAL CHARACTERISTIC MEASUREMENT AND COMPENSATION APPARATUS AND METHOD

CROSS-REFERENCE TO RELATED APPLICATIONS

This non-provisional application claims the benefit of U.S. Provisional Patent Application Ser. No. 60/424,763, filed on Nov. 12, 2002, the disclosure of which is hereby incorporated by reference herein. This application is also related to U.S. patent application Ser. No. 10/147,149, filed on May 16, 2002, now U.S. Pat. No. 6,646,727, which has been assigned to an assignee common with the present application.

STATEMENT REGARDING FEDERALLY SPONSORED RESEARCH OR DEVELOPMENT

Not applicable

REFERENCE TO COMPACT DISK APPENDIX

Not applicable

BACKGROUND OF THE INVENTION

The present invention relates generally to the field of optical fiber communications systems and particularly to the measurement and compensation of optical component characteristics such as polarization mode dispersion (PMD) in such components and in systems that comprise such components. More particularly, the invention relates to a measurement apparatus and method that uses entangled photon technology.

As the demand for increased bandwidth continues, telecommunications providers are looking for new ways to provide the additional bandwidth. The ultimate bandwidth available in an optical communications channel (e.g., an optical fiber) is limited by its optical properties. In particular, if the transmission time of an optical pulse through an optical channel is dependent on its polarization, the channel is said to exhibit polarization mode dispersion. PMD results from the birefringence of optical materials in the optical path which leads to a differential propagation delay between the orthogonal polarization components of light transmitted through the optical channel. PMD limits the bandwidth of the optical channel because it broadens the optical pulses and increases the bit error rate (BER). As modulation speeds increase, pulse durations decrease, and accurate compensation of PMD are required to maintain a low BER. To control such compensators, precise characterization of the PMD of the optical channel is required.

Prior art methods of characterizing PMD have depended on classical optical (as opposed to quantum optical) phenomena. For example, the NetTest NEXUS Polarization Mode Dispersion Measurement System employs a Michelson interferometric technique to analyze PMD. Essentially these prior art systems attempt to measure the amplitude and relative phase of the two vector components of the polarized light. Other prior art systems use an optical signal analyzer (OSA) to measure the effects of PMD (that is, the system measures power variations at a fixed set of output polarization states as function of wavelength). In the former case, the light that has passed through the device under test must be divided into two arms of an interferometer, potentially introducing non-common path errors, while with the second approach the dispersive phase delay is not measured directly, it being inferred from the measured intensity variations.

One measurement apparatus that overcomes these difficulties was described in U.S. patent application Ser. No. 10/147,149. That apparatus uses quantum-optical phenomena to measure the effective time delay (the PMD) between polarization states of light the have propagated through an optical component, including an optical communications fiber. In that apparatus, pairs of quantum-optically entangled photons, each pair being a "twinon", are propagated through the optical component under test. At the output port of the optical component the twinons are directed into a two arm, quantum interferometer that includes a variable polarization-dependent delay element in one arm. The variable polarization dependent delay is scanned until a maximum in quantum coherence is detected. The delay inserted by the variable delay element when the correlation is maximum is then deemed to be the PMD of the element.

If an optical communications signal is simultaneously propagating through the element under test, the measured delay can be applied to separate a pre- or post-element compensation device, such compensation eliminating the detrimental effects of the delay.

The measurement apparatus (and method of measurement) itself and the functional separation between measurement and compensation suggested by the '149 application has several operational limitations. First, in order to identify the maximum in quantum coherence, the apparatus must scan through the maximum point. Second, in order to track the maximum (as is required when the PMD is time varying), the apparatus must continually rescan (or dither) in a range centered on the previous maximum point. Since said scanning and dithering is time consuming, there is a significant delay between the measurement of the PMD and the application of a compensating delay in the signal channel. That is, the compensation bandwidth is limited by the scan and process time of the measurement process. Thirdly, the functional separation between the measurement and the compensation requires a calibration to link the two; that is, a user must insure that the actual compensation applied accurately corresponds to the valued measured.

It is therefore desirable to have a measurement apparatus and method in which, once the PMD is determined, the PMD can be tracked without the need for dithering; such a method is typically based on a "signed" error signal, which indicates the direction in which a correction is required, and seeks a null in that error signal. Additionally, it is desirable to embody the compensation apparatus into the measurement apparatus such that the action of nulling the error signal in the measurement inherently adjusts the compensation apparatus to the proper value.

It will be appreciated that although PMD is used throughout as an example, the measurement and compensation method of the present invention applies equally to other optical characteristics such as chromatic dispersion, optical activity, or index change with temperature.

BRIEF SUMMARY OF THE INVENTION

The present invention relates to an apparatus and method for determining an optical property or characteristic of an optical component and for simultaneously compensating the effects of said characteristic in a signal also passing through said component. In one aspect the invention includes a differential entangled photon measurement approach for determining the value of said optical property, said approach eliminating the need for continual dithering of the independent variable typically found in hill-climbing peak detection systems. In another aspect the invention includes use of a single, continuously variable element, said element configured to function simultaneously as the feedback variable in the measurement approach and as the compensation element in the signal channel.

The method includes the generation of a beam of "twinons". Twinons are a pair of quantum mechanically entangled photons, typically emitted from a parametric down conversion optical process. Each photon in a twinon has a corresponding twin photon that is correlated with it in frequency (or energy), direction (or momentum) and polarization. Each of these photons loses its individuality when it becomes one half of an entangled pair. When the invention is applied to optical characteristic measurements, the apparatus is arranged such that each of the twin photons travels in substantially the same direction but differ in wavelength and polarization state. Specifically, the twin photons have orthogonal polarizations. Although every twinon in this invention has substantially the same total energy, each of the two twin photons generally has a different, random energy, within a range of energies determined by the configuration of the parametric down conversion.

The key to the invention is understanding that each twinon is a single entity that happens to be made up of two photons. The behavior of one photon is correlated with the behavior of the other, even when they appear to be in separate locations. When a twinon traverses an optical system in which there are multiple indistinguishable paths, quantum optical interference determines in which of the paths the photons will be detected. For example, destructive interference can prevent two different detectors from observing a photon simultaneously while quantum optical constructive interference can "force" one photon to appear at each detector. Thus, in the absence of any differential delay (viz., PMD) between the two orthogonally polarized twin photons, quantum-interference effects can either eliminate or reinforce coincident detections ("CD's") on two separated detectors. An equivalent statement can be made about other characteristics of optical components or systems. For example, twinon interference can be used to determine the chromatic dispersion (that is, wavelength dependent differential delay) of an optical fiber or system.

In this invention, the twinon beam is combined with a signal beam and the combined beam propagates through the optical element or device under test (DUT) before impinging on a beam dividing element that separates the signal beam from the twinon beam. The signal beam is directed to a compensation element while the twinon beam is directed to a beamsplitter at the input of a quantum-interferometric device (QID). Unlike classical interferometers, a QID does not bring two interfering photons together on a single detector. Instead, the two arms of the device each terminate at a separate detector. The operation of a QID is described in U.S. patent application Ser. No. 10/147,149, which is hereby incorporated in its entirety herein.

In the presence of a polarization-specific delay (viz., PMD), a wavelength-specific delay (viz., chromatic dispersion), or any other distinguishing effect, the twinon acts like two un-entangled photons. In this case, as in classical optics, each photon may be reflected or transmitted at the beamsplitter. About half of the time one photon will propagate down one arm of the QID and one photon will propagate down the other arm of the QID. Thus, when the photons are acting independently (that is, when they are distinguishable) the CD rate is substantially one half the maximum observable photon arrival rate (that is, for uncorrelated photons approximately half of the time there will be a coincident detection).

In one embodiment of the invention, one arm of the QID, the variable arm, includes a variable, characteristic-specific delay element—for example, in the case of PMD, a variable thickness quartz plate. This plate is preferably also the aforesaid compensation element through which the signal beam traverses. When the inserted delay from this element exactly compensates for the PMD induced delay, the twin photons are within a coherence length of each other and quantum interference takes hold. Depending on the phase of the photons, the CD count rate either dips to near zero or rises significantly. The inserted delay for which rate of coincident detections exhibits its maximum change is a measure of the PMD.

The variable arm of the QID (viz., the arm that includes the variable delay element) is subdivided into two branches with approximately a 50:50 division of the light between the two branches. Each branch directs photons through the delay element and onto a photon detector. The delay element has three spatially separated apertures through which light can pass and the delay experienced by light passing through the element increases generally linearly between the three apertures; that is, there is a fixed difference in the delays imparted by the delay element at each aperture. The two branches of the variable arm of the QID pass through the two extreme apertures of the delay element.

The signal beam, having been separated from the twinon beam, is directed to a compensation element that corrects for the undesired delay in the measured optical characteristic. In one embodiment the signal beam passes through the central aperture of the above described delay element. Since the polarization-specific delay in the delay element increases generally linearly between the three apertures, the delay experienced by the signal beam is substantially the average of the delay experienced by the two twinon branches. As will be described, by using the two twinon branches to identify delays which over- and under-compensate the PMD and physically controlling the variable component of the delay element, the invention automatically compensates the signal PMD in a closed-loop without dithering.

As was explained in the '149 application, a polarization-specific delay measurement operation in either of the QID branches can be described as scanning an independent variable (in this case delay of the polarization-specific delay element) and identifying the value of that variable for which an extrema in a dependent variable (in this case the CD rate) is observed. In the '149 application, as in any extrema seeking system, the system must scan past the extreme point in order to identify that point and, in order to track the extrema, the system must dither the independent variable to see if the dependent variable drops off in both directions. In a compensation system based on dithered quantum-optical measurements, the integration time required to make adequately high signal to noise ratio measurements limits the compensation bandwidth. In the present invention, dithering the independent variable is eliminated; instead, simultaneous measurements are performed at two separated values of the independent variable. Specifically, the two branches of the variable arm are sent through the polarization-specific delay element with delays that differ by approximately the correlation length of the twinon pair. Thus, when the CD rates for the two branches are equal, the the delay at the center aperture (where the signal enters) equals the measured optical characteristic. Moreover, under this symmetric condition, any change in the measured optical characteristic results in one branch having an increase in its CD rate while the other branch has a decrease its rate. By comparing the two signals both the sign and approximate magnitude of the variable delay adjustment is calculable.

In one embodiment the system includes an entangled photon source which projects a beam into the optical element to be measured (i.e., the device under test, DUT), a beam dividing element to divide the light exiting the optical element to be measured into two beams, a polarization-specific fixed delay element and a polarization-specific, variable delay element in one of the two beams, an optical beamsplitter in one of the two beams, a plurality of first detectors to detect the light emerging from the optical beamsplitter, and a second detector. The entangled photon source generates twinons, each of said twinons includes a first twin photon and a second twin photon that are correlated in time, wavelength and polarization. The beam dividing element defines a first optical path and a second optical path, the two optical paths being indistinguishable in the quantum-optical sense. The polarization-specific, variable delay element introduces a variable, differential time delay between the two orthogonal polarization states of the photons in the system. The fixed polarization-specific delay element provides a time delay bias between the two polarization states, thereby allowing the variable delay element to provide relatively negative and relatively positive time delays. The optical beamsplitter is designed to direct photons into two measurement beams that pass through the variable polarization-specific delay element at two separated locations, there being a fixed offset delay between the two locations. Each of the plurality of first detectors is positioned to receive one of the plurality of measurement beams and each is sensitive to the arrival of individual photons. The second detector, also sensitive to individual photons, is positioned to receive light from the beam dividing element along the second optical path. In one embodiment the system also includes a processor in communication with the plurality of first detectors and the second detector. The processor determines if a coincident detection of photons has occurred and calculates the CD rate.

In a second embodiment the apparatus includes the polarization-specific fixed delay element in the second optical path. A third embodiment additionally comprises a wavelength demultiplexer in the second arm of the QID.

Yet another embodiment of the apparatus includes an optical communication signal injector component and an optical signal extractor component at the source end and QID end of the DUT, respectively. Said injector and said extractor combine or separate said twin photon beam from an optical communication signal using wavelength, temporal, or spatial multiplexing. This embodiment may also have a fast shuttering device to block the entrance of the QID. The optical signal extractor directs the signal beam through the variable, polarization-specific delay element at a location between the aforesaid twinon beams. The delay effected on the signal beam is generally the average of the delays effected on the two twinon beams.

In one embodiment the method includes the steps of forming a first twin photon and a second twin photon, and transmitting the first twin photon and second twin photon through an optical element, wherein a polarization specific delay is induced. The method includes the additional steps of identifying coincidences in the detection of the twin photons at a first detector and at a second detector after transmission through the optical element, identifying coincidences in the detection of the twin photons at another first detector and at the second detector after transmission through the optical element, adjusting the relative delay in the paths taken by said twin photons until said rates of coincidence detections are equal, and determining said delay in said optical element in response to said steps of detecting.

A second embodiment of the method includes the steps of forming a first twin photon and a second twin photon, and transmitting the first twin photon and second twin photon through an optical element. The method further includes the steps of combining said twin photons with an optical communications signal prior to transmission through said optical element and separating said twin photons from said communications signal after transmission through said optical element. The method includes the additional steps of identifying coincidences in the detection of the twin photons at a first detector and at a second detector after transmission through the optical element, identifying coincidences in the detection of the twin photons at another first detector and at the second detector after transmission through the optical element, adjusting the relative delay in the paths taken by said twin photons until said rates of coincidence detections are equal, and applying the average delay as measured by said twin photons to the communications signal.

A third embodiment of the method includes all the steps of the second embodiment and, in addition, the steps of time multiplexing said twin photon beam and said optical communications signal.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE SEVERAL VIEWS OF THE DRAWING

The foregoing and other objects, features and advantages of the invention will become apparent from the following description in conjunction with the accompanying drawings, in which reference characters refer to the same parts throughout the different views. The drawings are not necessarily to scale; emphasis has instead been placed upon illustrating the principles of the invention. Of the drawings.

DETAILED DESCRIPTION OF THE INVENTION

Figure 1:
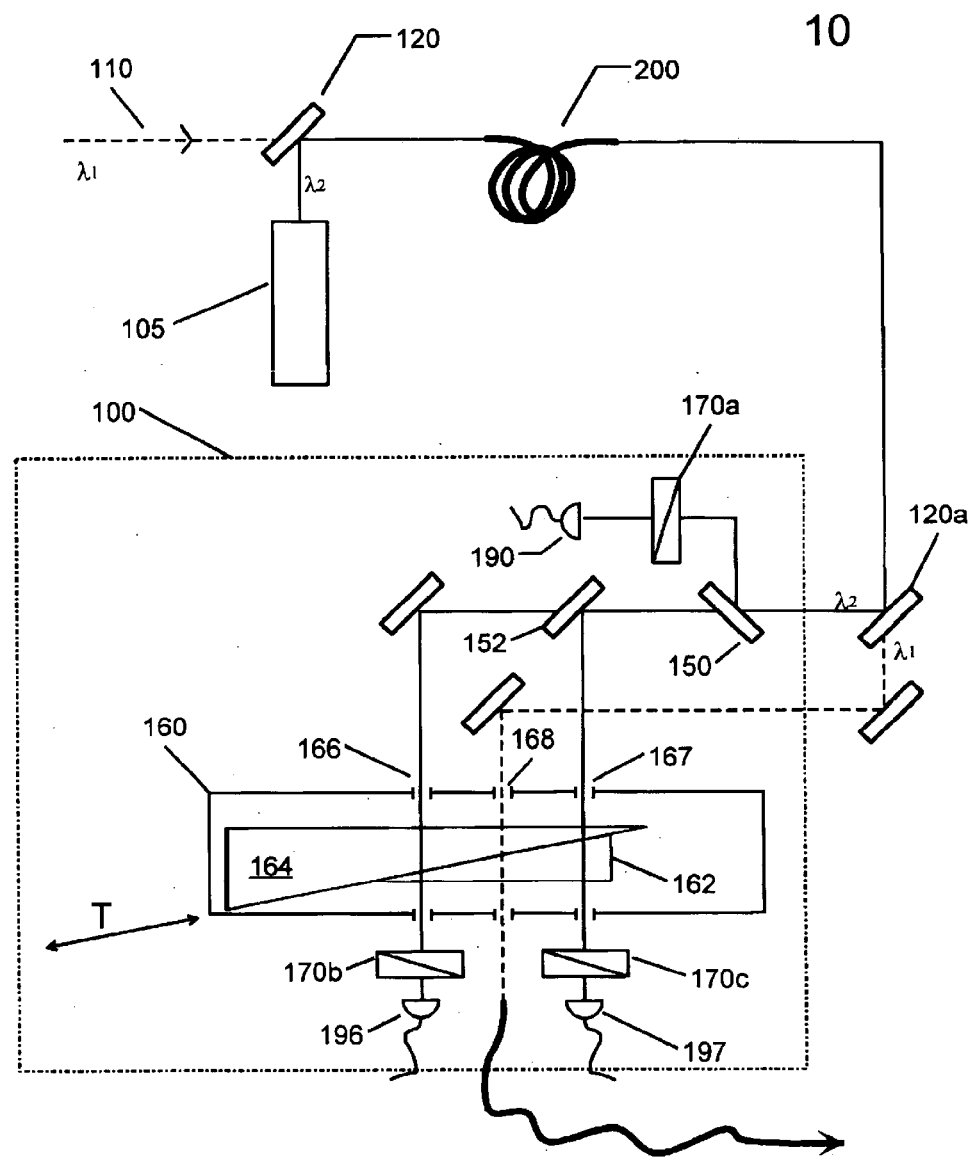
FIG. 1 is a highly schematic optical diagram of a compensation system built according to the invention.

Referring to FIG. 1, an apparatus 10 performs two functions simultaneously; it measures an optical characteristic (such as PMD) in a fiber optical link or a device under test using quantum-optical interference technology and it compensates for the same optical characteristic in a communications signal (said signal propagating in the fiber optical link or the device under test) by passing the communications signal through a variable polarization-specific delay element, the delay of which is controlled by the quantum-optical measurement.

As shown in the schematic of FIG. 1 the measurement and compensation apparatus 10 comprises a version of the measurement apparatus described in U.S. Utility patent application Ser. No. 10/147,149, suitably modified to make two simultaneous measurements, said two measurements being performed at two different delay values. As in the '149 application a beam of entangled photons ("twinons") from an entangled photon source 105 is combined with an optical communications signal 110 by a beam multiplexer 120. Preferably, the multiplexer is a dichroic beamsplitter and the twinon source 105 produces twinons at wavelengths not included within the communications signal bandwidth.

The combined beams propagate through a fiber optical link or a device-under-test (DUT) 200, during which propagation the beams generally undergo chromatic and/or polarization mode dispersion (PMD). Emerging from DUT 200 the combined beams pass through a beam divider 120a, preferably equivalent to multiplexer 120.

After the divider, the twinon beam is directed into a quantum interference device (QID) 100. The QID 100 generally has two optical paths or arms, a reference arm and a variable arm, defined by a beamsplitter 150 at its entrance aperture. Preferably beamsplitter 150 is a 50:50 non-polarizing beamsplitter. The reference arm of the QID comprises a polarizer 170a, preferably oriented at 45 degrees to the polarization axes of the twinons, and a detector 190, preferably sensitive to individual photons. The output signal from the detector is transmitted to a coincident detection processor (not illustrated).

The variable arm of the QID comprises two branches, these branches defined by a beamsplitter 152, also preferably 50:50, each branch being directed through a gradient, variable optical delay element 160 before passing through one of two polarizers 170b, 170c, each preferably set parallel to polarizer 170a, and impinging on one of two detectors 196, 197. Preferably detector 196 and detector 197 are each sensitive to individual photons. The output signals from the two variable arm detectors are transmitted to the coincident detection processor wherein comparisons with the time of arrival of photons in detector 190 are performed and the CD rate for each branch calculated.

The gradient, variable delay element (VDE) 160 generally introduces a small time/phase delay onto the photons passing through it; for use in measuring PMD the VDE introduces a differential delay between the two orthogonally polarized components of the photons that traverse the element. The VDE 160 preferably has three optical apertures 166, 167, 168 through which light may pass. There is a gradient in the delay between each aperture whereby light passing through central aperture 168 is subject to a delay that is approximately the average of the delays imposed on light passing through the outer apertures 166, 167. Preferably the difference in the delay between aperture 166 and aperture 167 is selected to a pre-determined value substantially equal to the correlation length of the twinons, said length being, typically, proportional to the full-width half maximum of the twinon correlation envelope.

In addition to having a gradient between apertures, VDE 160 also provides a variable range of delay; that is, the VDE has a variable base delay in all three apertures onto which the fixed gradient between the apertures is added. The VDE illustrated conceptually in FIG. 1 comprises two wedges of birefringent material, typically quartz. A fixed wedge 162 is matched to a movable wedge 164 to form a generally rectangular block of material, and movable wedge 164 is designed to translate parallel to the interface between the two wedges, as indicated by double headed arrow "T" The optical axes of the wedges are oriented at 90 degrees to each other. That is, if the slow axis of fixed wedge 162 is parallel to the vertical polarization axis of the photons then the slow axis of movable wedge 164 is parallel to the horizontal polarization axis of the photons. Thus, horizontally polarized light is first delayed (relative to vertically polarized light) as it propagates through movable wedge 164 and then (relative to vertically polarized light) advanced as it propagates through fixed wedge 162. The net delay experienced by a photon passing through the VDE is determined by the difference in its path length in the two wedges. Since apertures 166, 167, and 168 define different paths through the wedges, the net delay for photons passing through the apertures has a fixed gradient. In the illustrated VDE, for example, light propagating through aperture 166 will have a significant delay in its horizontal polarization component whereas light propagating through aperture 167 will have a significant advance in its horizontal component.

As movable wedge 164 is translated parallel to "T", the effective thickness of wedge 164 for any selected path changes while the effective thickness of wedge 162 is unchanged. Thus, by moving wedge 164 a wide range of positive or negative delays can be created while retaining the fixed gradient between apertures.

As shown in FIG. 1 the twinons in the two branches of the variable arm of the QID are directed through the outer apertures 166, 167. Preferably, the optical communications signal 110 is directed from the beam divider 120a to pass through VDE aperture 168, the path through which has a polarization-specific delay that is the average of the delay for the two twinon beams. After passing through the VDE the signal beam is allowed to continue on to its eventual destination.

Figure 2:
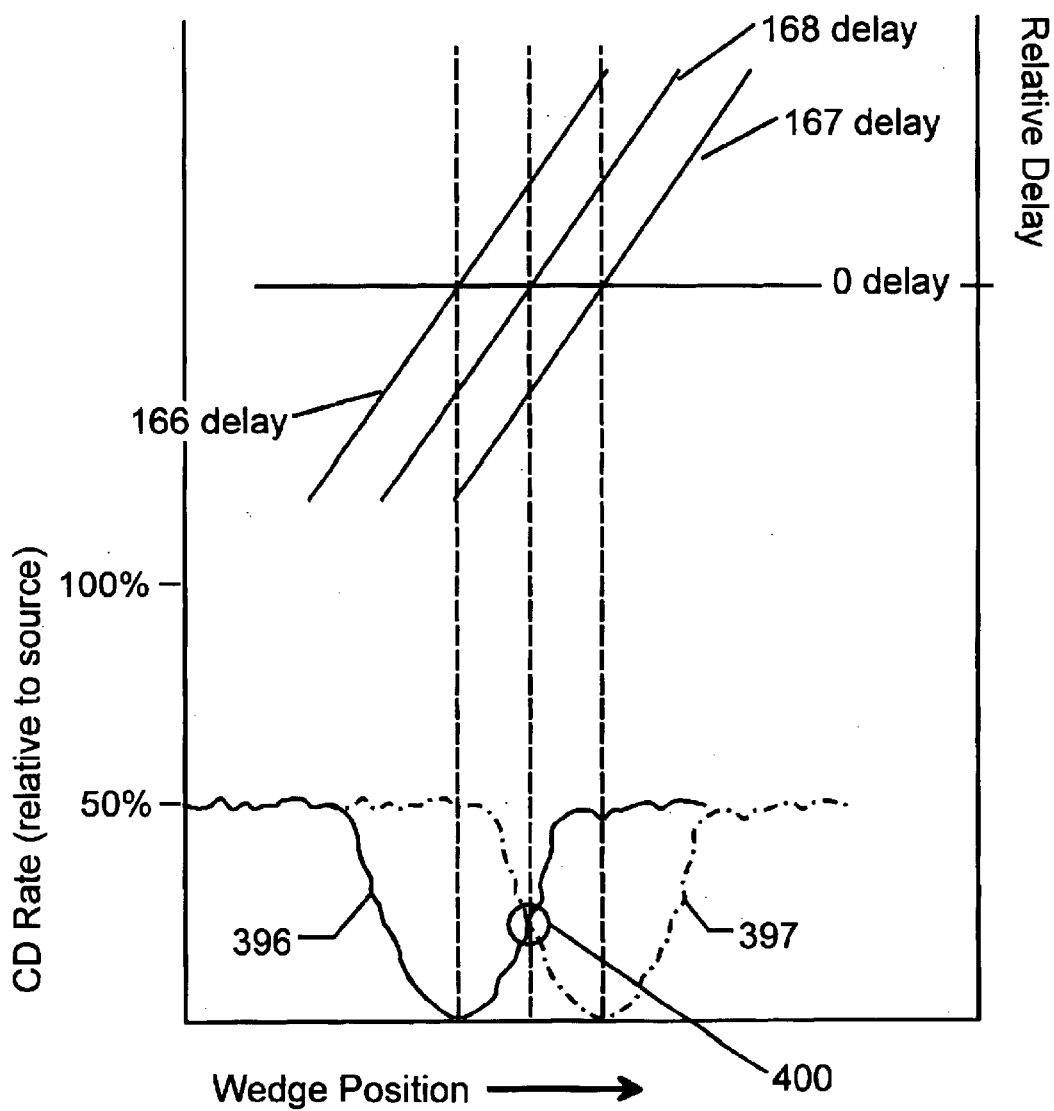
FIG. 2 is a diagram illustrating the expected rate coincidence detections at the two detectors in the variable arm of the Quantum Interference Device.

The variable portion of the delay in the VDE is controlled by the electronic processor in a closed-loop based on the signals from the two twinon beams, with the goal of setting the delay through aperture 168 equal to the optical characteristic introduced by DUT 200. FIG. 2 schematically shows the net delay through the three apertures and the CD rates for the twinon detectors as a function of the relative position of movable wedge 164. The signal processor counts the number of coincident photon detections that occur between detector 196 and detector 190 during a moving window of fixed duration. That count is a first CD rate 396. Similarly, the processor counts the number of coincident photon detections that occur between detector 197 and detector 190 to produce a second CD rate 397.

In operation, the VDE movable wedge 164 is adjusted incrementally, starting from a position wherein the delay in both apertures 166, 167 is more negative than the expected delay in DUT 200, while the CD rates 396, 397 are monitored. Since the delay exceeds the quantum correlation length in every twinon pair, the two photons in the twinon behave as two independent photons. As illustrated in FIG. 2 and explained in the '149 application, the CD rate for decorrelated twinons traveling in a QID is approximately 50% of the twinon source output (after path losses are accounted for). In the present apparatus, wherein the variable arm of the QID is divided into two branches by a 50:50 beamsplitter, the CD rates of the two branches are substantially equal.

When the VDE movable wedge 164 is adjusted to the point that the variable delay for any optical path approaches the delay in DUT 200, then, as described in the '149 application, the twinons become correlated and quantum interference is observed. In the FIG. 2, the preferred destructive interference is illustrated, wherein the CD rate drops to zero when the twinons are fully correlated. Since aperture 167 has a fixed delay offset relative to aperture 166, the dip in CD rate 397 occurs at a different setting of the movable wedge 164. Because the correlation envelope is symmetric in delay, the CD rate has the same value at equal offsets to either side of full correlation (zero net delay). Of course, approaching full correlation the CD rate is declining while going away from full correlation the CD rate is increasing.

Since the communications signal 110 preferably passes through aperture 168, it is subject to a delay that is substantially the average of the delays in the twinon beam apertures 166, 167. Thus, to set the compensation delay for signal 110 to a particular value it is sufficient to set the delays in aperture 166 and aperture 167 to an equal but opposite offset from the desired value. From the symmetry of the correlation envelope, the desired delays in apertures 166, 167 will occur when the CD rates 396, 397 are equal, as indicated by crossover point 400 in FIG. 2. Thus, the PMD in the communications signal 110 is fully compensated when VDE movable wedge 164 is positioned to make CD rates 166, 167 equal. Furthermore, closed loop tracking of the PMD compensation is easily accomplished by monitoring the changes in the CD rates. If rate 397 is larger than rate 396, then the delay should be increased and if rate 397 is smaller than rate 396 then the delay should be decreased. Since the difference in rates is linearly related to the delay error (at least near the target value for the delay) a servo control analysis can be performed to calculate the feedback control parameters that will optimize the compensation for any given set of operating conditions.

Figure 4:
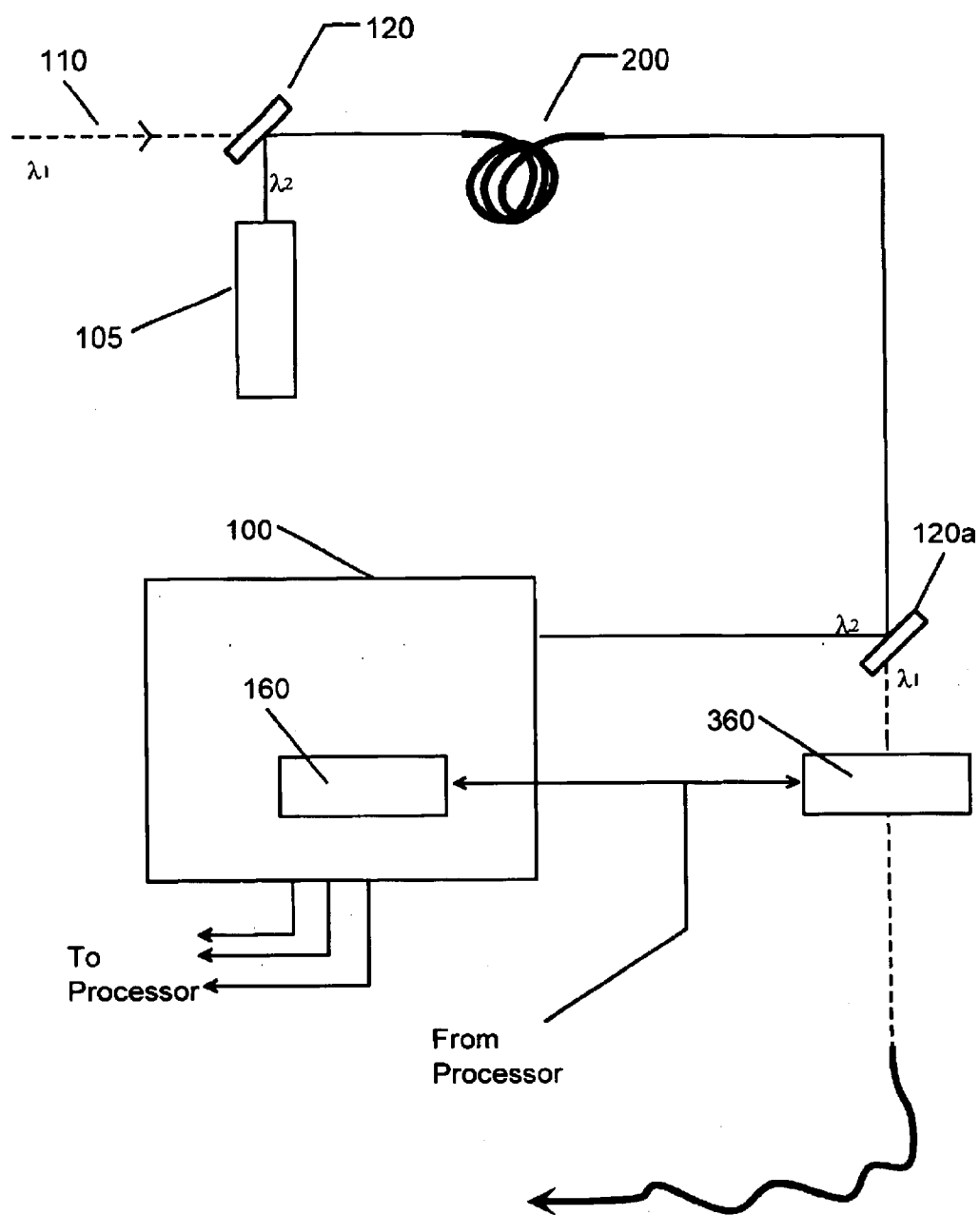
FIG. 4 is a schematic illustration of a second embodiment of a compensations system built according to the invention.

In an alternative embodiment of the invention, the delay measurement function (applied to the twinon beams) and the compensation function (applied to the signal beam) are separated. As indicated schematically in the block diagram of FIG. 4, said separation is effected by linking the position control of the measurement VDE 160 to a second VDE, 360, through which the signal beam is transmitted. After an initial calibration to match VDE 360 to VDE 160, the compensation delay applied to signal beam 110 tracks the delay measured from VDE 160.

It will be clear to one of skill in the art that any of the various QID configurations disclosed in the '149 application may be modified to perform the double measurement of the twinon beams described above. For example, beam multiplexer 120 and beam divider 120a may be replaced with time multiplexing optical switches. The switch replacing multiplexer 120 allows either the signal beam or the twinon beam to pass into the DUT 200, but not both, while the switch replacing divider 120a directs the light emerging from DUT 200 into either the QID or the delay compensation, but not both. By proper synchronization, by which the twinon beam and the signal beam are time-multiplexed into the DUT, the twinon beam provides the delay information for the measurement while the signal beam is properly compensated by the delay compensation element.

In yet another embodiment, wherein the characteristic to be measured by the invention is a wavelength-dependent delay, a wavelength demultiplexer is inserted after polarizer 170a. Each output channel of said wavelength demultiplexer, as described in the '149 patent application, includes only twinons in a narrow wavelength band. Each output is followed by its own photon detector, each of which is similar is design and sensitivity to detector 190. The output signals from all of these detectors are sent to the processor wherein coincident detections are identified and recorded as a function of wavelength. As in the previously described embodiments, the VDE delay value at which there is peak or dip in the CD rate in each wavelength channel is a measure of the optical characteristic value. Said delay value(s) may be used to drive an appropriate wavelength-dependent delay compensator.

Figure 3:
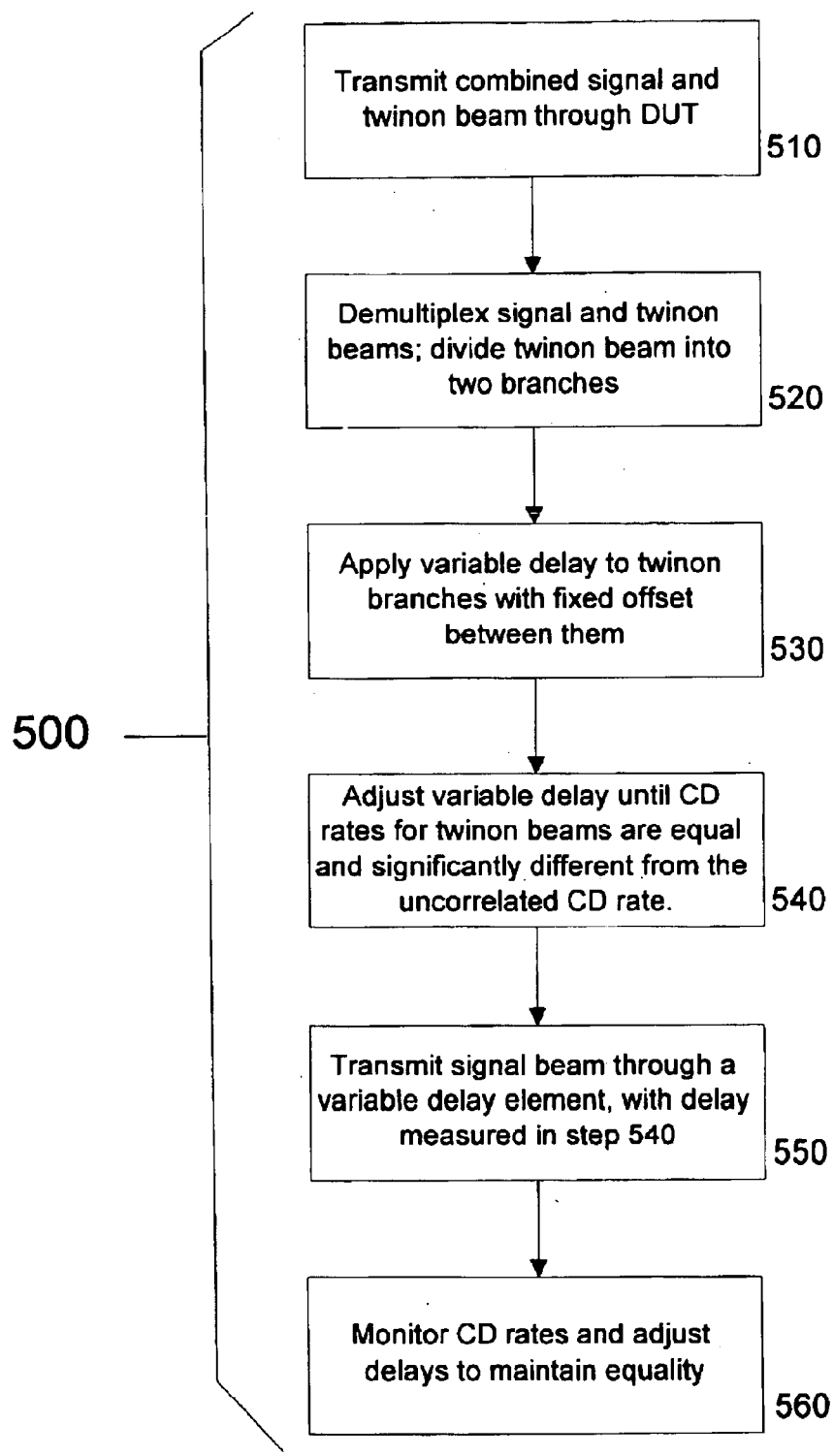
FIG. 3 is a flowchart representation of the method for setting the compensation for the optical characteristic being measured.

FIG. 3 is a flowchart of a method 500 for using the apparatus 10 of FIG. 1, or equivalent apparatus thereto, to first measure and then compensate PMD or other differential delay in an optical communications signal, said delay having been induced by a known device. The method includes a first step 510 of transmitting a twinon beam through the same device (the device under test) as the communications signal. Further the method includes a step 520 of separating, or demultiplexing, the twinon beam from the signal beam and further dividing the twinon beam into a reference arm and into at least two branches of a variable arm in a Quantum Interference Device. A third step 530 of the method comprises applying a variable polarization- or wavelength-specific delay to the two branches of the variable arm, wherein the two branches also have a fixed offset between them.

The method additionally includes with step 540, wherein the variable delay is adjusted until the coincident detection rate between the branches of the variable arm and the reference arm are equal and significantly higher or lower than the CD rate for uncorrelated twinons.

Further, the method includes a step 550 whereby the signal beam is transmitted through a variable delay element, wherein the delay is set based on the delays measured in step 540.

Lastly, the method includes a step 560 whereby the CD rates are monitored, said step further including adjusting the variable delay to maintain equal CD rates for the twinons in the two branches of the reference arm and the delay in the signal beam VDE being correspondingly adjusted.

It will be clear to one of skill in the art that the apparatus and method described herein may be implemented in a variety of equitant embodiments without deviating from the intent of the inventors. For example, any number of alternative optical layouts and arrangements will effect the same functions on the twinon and signal beams. Similarly, the variable optical delay elements may be implemented with mechanically displaced wedges, as described herein, or, for example, with electro-optical crystals whose delay is controlled by an applied voltage. Additionally, the three variable delays required in the apparatus can be embodied in a single VDE, as preferred, or in two or even three devices.

What I claim as my invention is:

1. A quantum optical measurement apparatus for determining an optical characteristic of an optical element comprising:

an entangled photon source in optical communication with the optical element to be measured, said entangled photon source generating a plurality of photon pairs (twinons), each of said twinons comprising a first twin photon and a second twin photon, said first twin photon being correlated to said second twin photon in at least one of time, wavelength and polarization;

a first beamsplitter element in optical communication with said optical element to be measured, said beamsplitter element providing a first optical path and a second optical path for said twinons;

a second beamsplitter element, along said first optical path, in optical communication with said first beamsplitter element, said second beamsplitter element providing a first optical branch and a second optical branch for said twinons;

a variable optical delay element simultaneously in optical communication with both the first and second optical branches, wherein there is an additional predetermined fixed delay between the first and second optical branches, wherein also said variable optical delay element is controlled by an external signal;

a plurality of first detectors in optical communication with said second beamsplitter element, each of said first detectors adapted to receive photons in one of said optical branches; and a second detector in optical communication with said first beamsplitter element along said second optical path, wherein each of said plurality of first detectors and said second detector is preceded by an optical polarizer, each of said polarizers being oriented at 45 degrees to the polarization axes of said twinons.

2. The quantum optical measurement apparatus of claim 1 further comprising an electronic processing unit in communication with said plurality of first detectors and said second detector.

3. The quantum optical measurement apparatus of claim 2 wherein said processing unit is adapted to identify coincident photon detections in said second detector, said coincident detections being photon detections in said second detector that occur within a pre-determined time window before or after a photon detection in one of said plurality of first detectors.

4. The quantum optical measurement apparatus of claim 3 wherein said processing unit is adapted to generate a rate of coincidence detections for each of said plurality of first detectors.

5. The quantum optical measurement apparatus of claim 4 wherein said processing unit is further adapted to adjust the delay of the variable optical delay element in accordance with a predetermined program.

6. The processing unit of claim 5 wherein the predetermined program includes the steps of identifying the delay of the variable optical delay element for which the rate of coincident detections is substantially equal for all of said plurality of first detectors.

7. The processing unit of claim 6 wherein the predetermined program further includes the step of adjusting the delay of the variable optical delay element to maintain the substantially equal rate of coincident detections for all of said plurality of first detectors.

8. A quantum optical apparatus for compensating an optical characteristic of an optical element comprising:

a beam multiplexer in optical communication with an entrance aperture of said optical element, said beam multiplexer comprising a first input aperture, a second input aperture, and an output aperture;

an entangled photon source in optical communication with said first input aperture, said entangled photon source generating a plurality of photon pairs (twinons), each of said twinons comprising a first twin photon and a second twin photon, said first twin photon being correlated to said second twin photon in at least one of time, wavelength and polarization;

a beam divider in optical communication with an output aperture of said optical element, said beam divider comprising an input aperture, a first output aperture and a second output aperture, said first output aperture defining a twinon optical path and said second output aperture defining a signal output path;

said twinon optical path further comprising:

a first beamsplitter element, located in said twinon optical path, said beamsplitter element in optical communication with said first output aperture of said beam divider, said beamsplitter element providing a reference optical path and a variable delay optical path for said twinons;

a second beamsplitter element, along said variable delay optical path, in optical communication with said first beamsplitter element, said second beamsplitter element providing a first optical branch and a second optical branch for said twinons;

a variable optical delay element simultaneously in optical communication with both the first and second optical branches, wherein there is an additional predetermined fixed delay between the first and second optical branches, wherein said variable optical delay element is controlled by an external signal;

a plurality of first detectors in optical communication with said variable delay element, each of said first detectors adapted to receive photons in one of said optical branches after the variable optical delay element; and a second detector in optical communication with said first beamsplitter element along said reference optical path;

wherein each of said plurality of first detectors and said second detector is preceded by an optical polarizer, each of said polarizers being oriented at 45 degrees to the polarization axes of said twinons, and said signal optical path further comprising:

a second variable optical delay element, the delay of said second variable optical delay element being controlled by an external signal;

wherein an optical communication signal input to the second input aperture of said beam multiplexer propagates through said optical element and through said second variable optical delay element.

9. The quantum optical apparatus of claim 8 wherein said processing unit is adapted to identify coincident photon detections in said second detector, said coincident detections being photon detections in said second detector that occur within a pre-determined time window before or after a photon detection in one of said plurality of first detectors.

10. The quantum optical apparatus of claim 9 wherein said processor is adapted to generate a rate of coincidence detections for each of said plurality of first detectors.

11. The quantum optical apparatus of claim 9 wherein said processor is further adapted to adjust the delay of said first and said second variable optical delay elements with control signals, in accordance with a predetermined program.

12. The electronic processor of claim 11 wherein the predetermined program includes the steps of identifying the delay of the variable optical delay module for which the rate of coincident detections is substantially equal for all of said plurality of first detectors.

13. The electronic processor of claim 12 wherein the predetermined program further includes the step of adjusting the delay of said first variable optical delay module to maintain the substantially equal rate of coincident detections for all of said plurality of first detectors.

14. The electronic processor of claim 12 wherein the predetermined program further includes the step of adjusting the delay of said second variable optical delay module to counteract the identified delay.

15. The quantum optical apparatus of claim 8 wherein said second variable optical delay element and said first variable optical delay element are mechanically connected and controlled thereby by a single control signal.

16. The quantum optical apparatus of claim 8 wherein said second variable optical delay element and said first variable optical delay element are embodied in a single variable optical delay element.

17. The variable optical delay element of claim 16 comprising a first optical path, a second optical path and a third optical path wherein the delay in the three optical paths have a predetermined relationship, said relationship being preferably linear.

18. A quantum optical measurement method for determining an optical characteristic of an optical element comprising the steps of:
- a first step of transmitting a twinon beam through said optical element;
- a second step of dividing the twinon beam exiting said optical element into a reference arm and a variable arm, said second step further including dividing said variable arm into a first branches and a second branch, wherein said reference arm and said variable arm are arms of a Quantum Interference Device;
- a third step comprising applying a variable polarization- or wavelength-specific delay to said two branches of the variable arm, wherein the two branches also have a fixed delay offset between them;
- a fourth step of measuring the coincident photon detection (CD) rate between said reference arm and said variable arm, wherein the variable delay is adjusted until the CD rate between said two branches of the variable arm and the reference arm are equal and significantly higher or lower than the CD rate for uncorrelated twinons; and
- a fifth step whereby CD rates are monitored, said step further including adjusting the variable delay to maintain equal CD rates for the twinons in the two branches of the reference arm.

19. A quantum optical compensation method for correcting the effect an optical characteristic of an optical element on an optical communications signal comprising the steps of:
- a first step of transmitting a multiplexed twinon beam and an optical communications signal through said optical element;
- a second step of demultiplexing said communications signal and said twinon beam, said second step further comprising dividing the twinon beam exiting said optical element into a reference arm and a variable arm, said second step further including dividing said variable arm into a first branches and a second branch, wherein said reference arm and said variable arm are arms of a Quantum Interference Device;
- a third step comprising applying a variable polarization- or wavelength-specific delay to said two branches of the variable arm, wherein the two branches also have a fixed delay offset between them;
- a fourth step of measuring the coincident photon detection (CD) rate between said reference arm and said variable arm, wherein the variable delay is adjusted until the coincident detection rate between said two branches of the variable arm and the reference arm are equal and significantly higher or lower than the CD rate for uncorrelated twinons;
- a fifth step of applying a variable optical delay to said optical communications signal, wherein the value of said delay is determined from the delay measured in said twinon beam; and
- a sixth step whereby CD rates are monitored, said step further including adjusting the variable delay to maintain equal CD rates for the twinons in the two branches of the reference arm and correspondingly adjusting the variable delay applied to the optical communications signal.

* * * * *